(12) United States Patent
Luxon

(10) Patent No.: US 6,273,010 B1
(45) Date of Patent: Aug. 14, 2001

(54) SINGULATING BRUSH ASSEMBLY

(75) Inventor: Gary Deloy Luxon, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/535,402

(22) Filed: Mar. 27, 2000

(51) Int. Cl.$^7$ .................................................. A01C 7/04
(52) U.S. Cl. ........................... 111/184; 111/77; 221/254; 221/263; 221/166; 222/352
(58) Field of Search ..................... 111/184, 183, 111/177, 170, 77, 78; 221/254, 263, 264, 265, 266, 185, 163, 166, 277, 311; 222/352, 368

(56) References Cited

U.S. PATENT DOCUMENTS

| | | | | |
|---|---|---|---|---|
| 4,307,822 | * | 12/1981 | Hardesty | 222/352 |
| 4,449,642 | * | 5/1984 | Dooley | 221/211 |
| 4,450,979 | * | 5/1984 | Deckler | 221/263 |
| 4,793,511 | * | 12/1988 | Ankum et al. | 221/211 |
| 5,058,766 | * | 10/1991 | Deckler | 221/254 |
| 5,784,985 | * | 7/1998 | Lodico et al. | 111/184 |
| 6,176,393 | * | 1/2001 | Luxon | 221/211 |
| 6,216,615 | * | 4/2000 | Romans | 111/177 |

FOREIGN PATENT DOCUMENTS

3615189 * 4/1987 (DE) ................................... 111/184

OTHER PUBLICATIONS

Deere & Company Operator's Manual entitled "7000 Max-–Emerge 4–Row Narrow, 4–Row Wide, and 6–Row Narron Drawn Planters" OM–A42741 Issue E1, cover and introduction pages and pp. 96–99,j printed in U.S.A.
Deere & Company Brochure entitled Drawn, Integral and Unit Planters, cover page and pp. 9–10, printed in the U.S.A.

* cited by examiner

Primary Examiner—Victor Batson

(57) ABSTRACT

A singulating brush for a finger pickup seed meter comprising a flat carrier on which two sets of bristles are mounted. The flat carrier defines two mounting positions for the singulating brush. In its first mounting position the first set of bristles of the singulating brush contact the seed engaging spoons of the radially extending fingers for dislodging extraneous seed. In is second mounting position the second set of bristles of the singulating brush contact the seed engaging spoons of the radially extending fingers for dislodging extraneous seed. The first set of bristles is stiffer than the second set of bristles.

23 Claims, 2 Drawing Sheets

SINGULATING BRUSH ASSEMBLY

BACKGROUND OF THE INVENTION

1. Field of the Invention

The present invention is directed to a singulating brush assembly having two sets of bristles which can be selectively used in a finger pickup seed meter.

2. Description of the Prior Art

Finger pickup seed meters are popular seed meters used in row crop planters. The finger pickup seed meter comprises a rotatable member having a series of radially extending fingers having seed trapping spoons. The rotatable member adjoins a stationary plate having a seed outlet. The stationary plate has a finger pickup side and a conveyor side. A seed puddle is formed adjacent to the finger pickup side of the stationary plate so that spoons passing through the seed puddle are first opened by a camming mechanism and then closed trapping the seed between the stationary plate and the seed engaging spoons. The seed engaging spoons rotate the trapped upwardly out of the seed puddle to the seed outlet. The seed is passed through the seed outlet to the conveyor side of the stationary plate. A belt conveyor receives the seed and transports the seed to a downwardly extending seed tube. The seed tube in turn directs the seed to the planting furrow formed by a furrow opener.

Immediately upstream from the seed outlet is a singulating brush for eliminating extra seed trapped by the seed engaging spoons. The brush knocks off the extraneous seed returning to the seed puddle. The bristles of the singulating brush pass through a brush aperture formed in the stationary plate. It has been found that at higher planting speeds or with smaller seeds that finger pickup meters tend to overpopulate. Brushes having stiffer bristles improve seed meter performance with smaller seeds and higher planting speeds, but stiffer brushes tend under populate with larger seeds and slower planting speeds.

SUMMARY

It is an object of the present invention to provide a singulating brush assembly having two sets of bristles that have corresponding mounting positions so that one set of bristles can be selectively positioned to eliminate extra seed.

A finger pickup seed meter is provided with a rotating member having readily extending fingers with seed engaging spoons. The rotatable member adjoins a stationary plate having a seed outlet and a singulating brush aperture. A singulating brush assembly is mounted to the stationary plate upstream from the seed outlet. The singulating brush assembly comprises a flat carrier having a first mounting position and a second mounting position. The flat carrier is also provided with a first set of bristles and a second set of bristles. The first set of bristles pass through the singulating brush aperture and come into contact with the seed engaging spoons when the flat carrier is mounted to the stationary plate in its first mounting position. Similarly, the second set of bristles extend through the singulating brush aperture and come into contact with the seed engaging spoons when the flat carrier is mounted to the stationary plate in its second mounting position. The two sets of bristles have different stiffness so that one set would be used with smaller seeds and/or higher planting speeds, wherein the other set of bristles would be used for more conventionally sized seed and more conventional planting speeds. The singulating brush is mounted to the stationary plate by a carrier. The carrier is bolted to the stationary plate.

DETAILED DESCRIPTION

Figure 1:
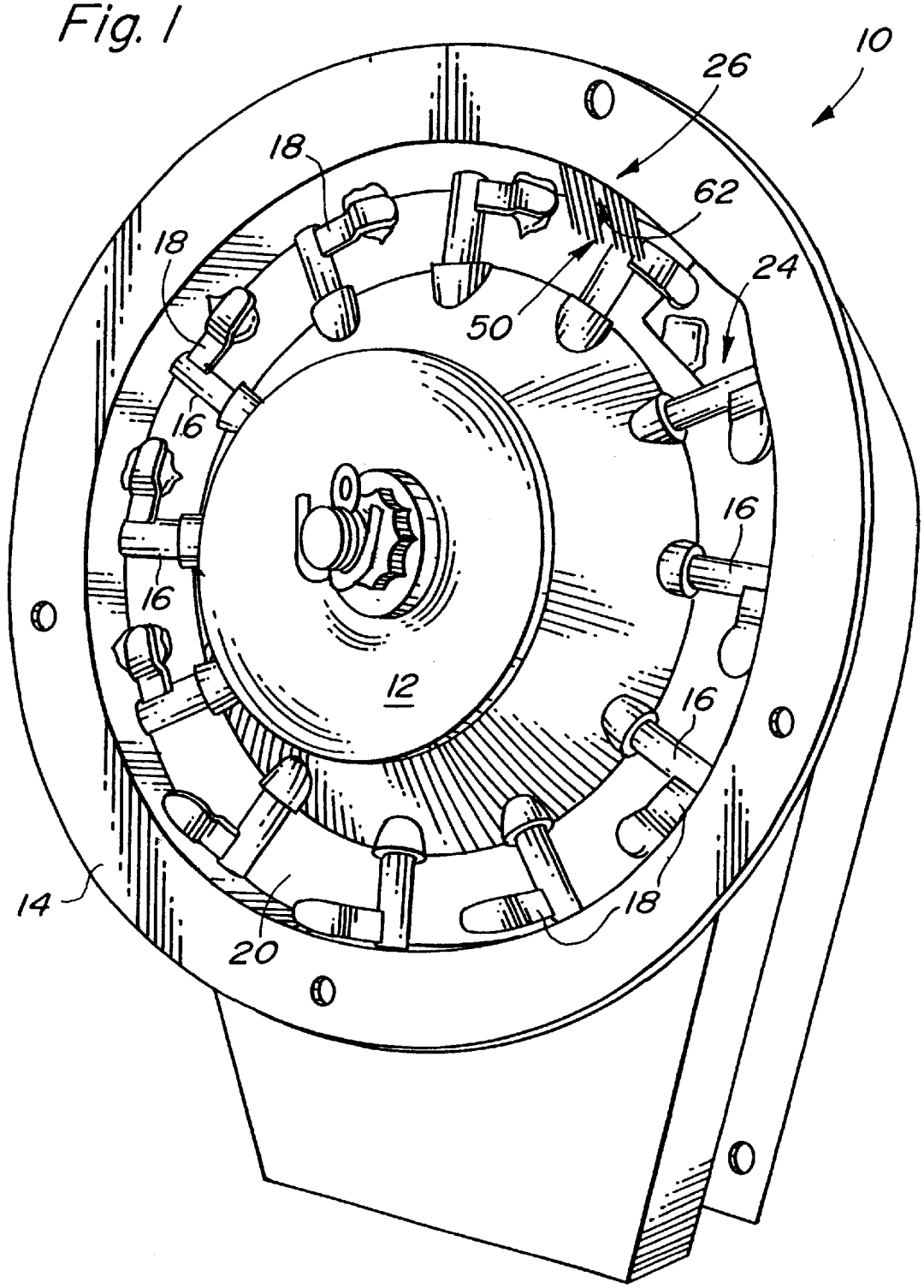
FIG. 1 is a perspective view of the finger pickup side of a finger pickup seed meter.

A finger pickup seed meter 10 is provided with a rotating member 12 and a stationary plate 14. The rotating member 12 has radially extending fingers 16. Each of the radially extending fingers 16 is provided with a seed engaging spoon 18 for trapping seed against the stationary plate 14. The stationary plate 14 has a finger pickup side 20 and a conveyor side 22, the finger pickup side 20 being illustrated in FIG. 1. A seed outlet 24, in the form of an aperture, extends between the finger pickup side 20 and the conveyor side 22 of the stationary plate 14. The bristles of a singulating brush 26 are located upstream from the seed outlet 24 for removing extra seed trapped by the seed engaging spoons 18.

In operation, a seed puddle is formed against the bottom of the stationary plate 14 on the finger pickup side 20. As the radially extending fingers 16 are rotated clockwise from their two o'clock position to their seven o'clock position, the seed engaging spoons 18 are opened away from the stationary plate 14 by a camming mechanism, not shown. The opened seed engaging spoons 18 pass through the seed puddle. At the seven o'clock position the seed engaging spoons 18 are biased closed by springs trapping seeds between the spoons 18 and the finger pickup side 20 of the stationary plate 14.

The singulating brush 26 comprises a flat carrier 30 having a first, second, third and fourth side edges 32, 34, 36 and 38, respectively. The first side edge 32 and the second side edge 34 define an obtuse angle 40. The third side edge 36 and the fourth side edge 38 define an obtuse angle 42. The second and third side edges 34 and 36 and the first and fourth side edges 32 and 38 define acute angles 44 and 46, respectively. A first set of bristles 50 extends outwardly from the fourth side edge 38 and a second set of bristles 52 extends outwardly from the third side edge 36. Each set of bristles 50 and 52 are arranged in two bundles of bristles 54 and 56. The fourth side edge 38 and the third side edge 36 are provided with hooks 58. The fourth side edge 38 and respective hook 58 define a first mounting position for the singulating brush assembly 26. When the singulating brush 26 is in its first mounting position, illustrated in FIG. 2, the first set of bristles 50 extend towards the seed engaging spoons 18 contacting seed trapped in the spoons 18. Similarly, the third side edge 36 and respective hook 58 defines a second mounting position for the singulating brush assembly 26. In the second mounting position the second set of bristles 52 extend into contact with the spoons 18.

Figure 2:
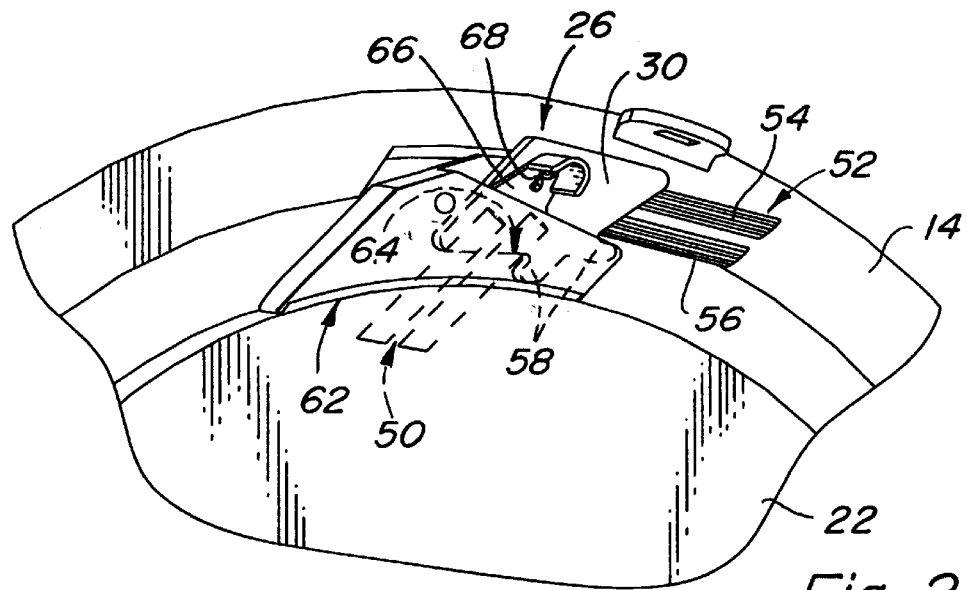
FIG. 2 is a partial perspective view of the singulating brush assembly located on the conveyor side of the finger pickup seed meter.
Figure 3:
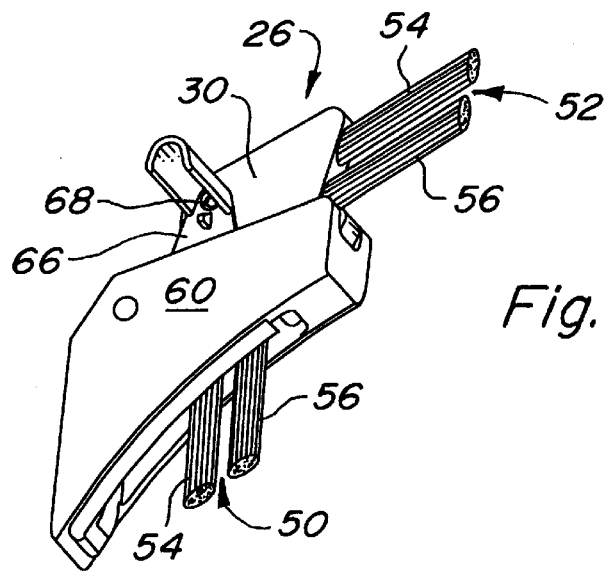
FIG. 3 is a perspective view of the singulating brush and carrier.
Figure 4:
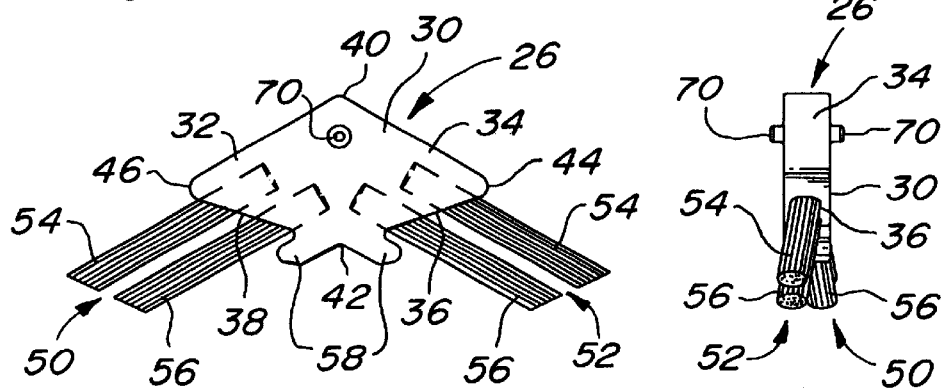
FIG. 4 is a side view of the singulating brush.
Figure 5:
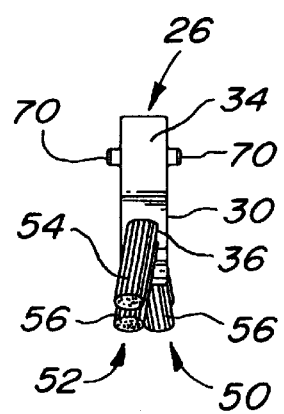
FIG. 5 is a front view of the singulating brush.

The first set of bristles 50 is stiffer than the second set of bristles 52. When a farmer is operating at higher planting speeds and/or is working with smaller seeds the brush is put in its first mounting position so that the stiffer bristles contact the seed trapped in the spoons 18. In more normal operating conditions the singulating brush assembly 26 is placed in its second mounting position. As shown in FIG. 5, the two sets of bristles 50 and 52 are canted laterally in opposite directions. In this way the set of bristles not in use extends along the conveyor side of the stationary plate as shown in FIG. 2.

The singulating brush assembly 26 is mounted to the stationary plate 14 by a carrier 60 that is bolted to the stationary plate 14. The carrier 60 overlies a brush aperture slot 62 formed in the stationary plate 14. The carrier 60 has internal surfaces 64 contoured to receive the third side edge 36 and respective hook 58 or the fourth side edge 38 and the respective hook 58 as illustrated in phantom in FIG. 2. The carrier 60 is provided with an upwardly extending ear 66 having a hole 68 therein in which is inserted an integral cylindrical stud 70 formed on the flat carrier 30. The opposite side of the carrier 60 is provided with a semi-cylindrical depression for receiving the stud 70 located on the opposite side of the flat carrier 30. The studs 70 and the cooperating hole 68 and the semi-cylindrical depression act to provide the farmer with positive reinforcement that the singulating brush 26 is correctly positioned in the carrier 60.

The carrier 60 and singulating brush 26 are sized to fit into older finger pickup seed meters so this singulating brush assembly can be readily retrofitted into these planters. The carrier 60 and flat carrier 30 are made of plastic and both sets of bristles 50 and 52 are made of nylon.

The present invention should not be limited by the above described embodiment, but should be limited solely by the clams that follow.

I claim:

1. A finger pickup seed meter for metering seed on a seeding machine, the seed meter comprising:
   a rotatable member having a plurality of radially extending fingers, each of the fingers having a seed engaging spoon;
   a stationary plate adjoining the rotatable member, the stationary plate having a seed outlet formed by an aperture in the stationary plate, as the rotatable member is rotated seed is trapped between the stationary plate and the seed engaging spoons, the seed trapped by the seed engaging spoons and the stationary plate is rotated by the rotating seed engaging spoons to the seed outlet where the seed passes through the aperture;
   a singulating brush for removing extra seed trapped by the seed engaging spoons is mounted to the stationary plate upstream from the seed outlet, the singulating brush assembly has a first mounting position and a second mounting position for mounting the singulating brush to the stationary plate, a first set of bristles is associated with the first mounting position with the first set of bristles being in contact with the radially extending fingers upstream from the seed outlet when the singulating brush assembly is in the first mounting position, a second set of bristles is associated with the second mounting position with the second set of bristles being in contact with the radially extending fingers upstream from the seed outlet when the singulating brush assembly is in the second mounting position.

2. A finger pickup seed meter as defined by claim 1 wherein the first set of bristles is stiffer than the second set of bristles.

3. A finger pickup seed meter as defined by claim 2 wherein the stationary plate has a finger pickup side and a conveyor side and the aperture extends through the plate between the finger pickup side and the conveyor side.

4. A finger pickup seed meter as defined by claim 3 wherein the stationary plate has a brush aperture through which one of the first set of bristles and the second set of bristles extend.

5. A finger pickup seed meter as defined by claim 4 wherein the singulating brush assembly is mounted to the conveyor side of the stationary plate.

6. A finger pickup seed meter as defined by claim 5 wherein the singulating brush assembly comprises a flat carrier having first, second, third and fourth side edges, the first and second side edges, and the third and fourth side edges define an obtuse angle, the second and third side edges and the first and fourth side edges defining an acute angle.

7. A finger pickup seed meter as defined by claim 6 wherein the first set of bristles extend outwardly from the fourth side edge and the second set of bristles extend outwardly from the third side edge.

8. A finger pickup seed meter as defined by claim 7 wherein the stationary plate is provided with a carrier for holding the singulating brush assembly.

9. A finger pickup seed meter as defined by claim 8 wherein the third side edge and the fourth side edge are provided with hooks for engaging the carrier.

10. A finger pickup seed meter as defined by claim 9 wherein the first brush assembly is canted laterally in a first direction and the second bush assembly is canted laterally in a second direction.

11. A stationary plate for a finger pickup seed meter, the stationary plate having a finger pickup side and a conveyor side, a seed outlet formed by an aperture extends through the stationary plate from the finger pickup side to the conveyor side, a carrier is mounted to the stationary plate, a singulating brush is mounted to the carrier, the singulating brush assembly has a first mounting position and a second mounting position for alternatively mounting the singulating brush to the carrier, a first set of bristles is associated with the first mounting position being located on the finger pickup side of the stationary plate when the singulating brush is in the first mounting position, a second set of bristles is associated with the second mounting position with the second set of bristles being located on the finger pickup side of the stationary plate when the singulating brush assembly is in the second mounting position.

12. A stationary plate as defined by claim 11 wherein the first set of bristles is stiffer than the second set of bristles.

13. A stationary plate as defined by claim 12 wherein stationary plate has a brush aperture through which one of the first set of bristles and the second set of bristles extend.

14. A stationary plate as defined by claim 13 wherein the carrier and the singulating brush assembly are mounted to the conveyor side of the stationary plate.

15. A stationary plate as defined by claim 14 wherein the singulating brush assembly comprises a flat carrier having first, second, third and fourth side edges, the first and second side edges, and the third and fourth side edges define an obtuse angle, the second and third side edges and the first and fourth side edges defining an acute angle.

16. A stationary plate as defined by claim 15 wherein the first set of bristles extend outwardly from the fourth side edge and the second set of bristles extend outwardly from the third side edge.

17. A stationary plate as defined by claim 16 wherein the third side edge and the fourth side edge are provided with hooks for engaging the carrier.

18. A stationary plate as defined by claim 17 wherein the first brush assembly is canted laterally in a first direction and the second bush assembly is canted laterally in a second direction.

19. A singulating brush assembly for a finger pickup seed meter, the singulating brush assembly comprising: a flat carrier having first, second, third and fourth side edges, the first and second side edges, and the third and fourth side edges define an obtuse angle, the second and third side edges and the first and fourth side edges defining an acute angle the first set of bristles extend outwardly from the fourth side edge and the second set of bristles extend outwardly from the third side edge, a first set of bristles extend outwardly from the fourth side edge and a second set of bristles extend outwardly from the third side edge, the side flat carrier define a first mounting position and a second mounting position, when the flat carrier is in its first mounting position the first set of bristles are used to singulate seed in a finger pickup seed meter, when the flat carrier is in its second mounting position the second set of bristles singulate seed in a finger pickup seed meter.

20. A singulating brush assembly as defined by claim 19 wherein the first set of bristles are more stiff than the second set of bristles.

21. A singulating brush assembly as defined by claim 20 wherein the third side edge and the fourth side edge are provided with hooks.

22. A singulating brush assembly as defined by claim 21 wherein the first brush assembly is canted laterally in a first direction and the second bush assembly is canted laterally in a second direction.

23. A singulating brush assembly as defined by claim 22 wherein the flat plate is provided with two laterally extending locating studs.

* * * * *